United States Patent
Quintin et al.

(10) Patent No.: US 11,190,404 B2
(45) Date of Patent: Nov. 30, 2021

(54) METHOD FOR ESTABLISHING COMMUNICATION ROUTES BETWEEN NODES OF A COMPUTER CLUSTER, CORRESPONDING COMPUTER PROGRAM AND COMPUTER CLUSTER

(71) Applicant: BULL SAS, Les Clayes-sous-Bois (FR)

(72) Inventors: Jean-Noël Quintin, Bourg-la-Reine (FR); John Gliksberg, Bruyères-le-Châtel (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/280,678

(22) Filed: Feb. 20, 2019

(65) Prior Publication Data
US 2019/0260645 A1    Aug. 22, 2019

(30) Foreign Application Priority Data

Feb. 22, 2018    (FR) ...................................... 1851558

(51) Int. Cl.
*H04L 12/24*    (2006.01)
*H04L 29/12*    (2006.01)
(Continued)

(52) U.S. Cl.
CPC .......... *H04L 41/12* (2013.01); *H04L 41/0893* (2013.01); *H04L 45/02* (2013.01);
(Continued)

(58) Field of Classification Search
CPC ..... H04L 61/1576; H04L 45/48; H04L 45/02; H04L 41/0893; H04L 41/12; H04L 61/2567; H04Q 11/0066; H04Q 2011/009
(Continued)

(56) References Cited

U.S. PATENT DOCUMENTS

| | | | | |
|---|---|---|---|---|
| 5,987,011 | A | * | 11/1999 | Toh ........................ H04W 40/10 370/331 |
| 6,980,537 | B1 | * | 12/2005 | Liu ........................ H04L 45/46 370/277 |

(Continued)

FOREIGN PATENT DOCUMENTS

| EP | 2 549 699 A1 | 1/2013 |
|---|---|---|
| FR | 3 037 463 A1 | 12/2016 |
| WO | WO 2014/036310 A1 | 3/2014 |

OTHER PUBLICATIONS

Search Report as issued in French Patent Application No. 1851558, dated Jul. 26, 2018.

(Continued)

*Primary Examiner* — Umar Cheema
*Assistant Examiner* — John Fan
(74) *Attorney, Agent, or Firm* — ARC IP Law, PC; Joseph J. Mayo

(57) ABSTRACT

A method includes obtaining the topology of a computer cluster, with first global numbers respectively assigned to the nodes thereof, and implementing, for each pair of nodes, an algorithm adapted for providing a communication route between the nodes, based on respective numbers of the nodes and the topology of the computer cluster. The method further includes selecting nodes and numbering the nodes in order to assign second global numbers thereto, which numbers are different from the first global numbers for at least one part of the selected nodes, the second global numbers of the selected nodes being successively separated by values each of which is different from the periodicity of each of at least one part of the communication links. Moreover, in order to implement the algorithm, the nodes are identified by the second global numbers thereof.

12 Claims, 2 Drawing Sheets

(51) Int. Cl.
  *H04Q 11/00* (2006.01)
  *H04L 12/751* (2013.01)
  *H04L 12/753* (2013.01)

(52) U.S. Cl.
  CPC .......... *H04L 45/48* (2013.01); *H04L 61/1576* (2013.01); *H04L 61/2567* (2013.01); *H04Q 11/0066* (2013.01); *H04Q 2011/009* (2013.01)

(58) Field of Classification Search
  USPC .......................................................... 709/238
  See application file for complete search history.

(56) References Cited

U.S. PATENT DOCUMENTS

| | | | | |
|---|---|---|---|---|
| 7,281,057 B2* | 10/2007 | Cain | ....................... | H04L 45/00 370/351 |
| 2002/0133608 A1* | 9/2002 | Godwin | .............. | H04L 63/0272 709/230 |
| 2013/0067113 A1* | 3/2013 | Dugue | .................. | H04L 45/125 709/241 |
| 2014/0185611 A1* | 7/2014 | Lie | ........................ | H04L 49/356 370/355 |
| 2017/0063636 A1 | 3/2017 | Vigneras et al. | | |

OTHER PUBLICATIONS

Zahavi, E., "D-Mod-K Routing Providing Non-Blocking Traffic for Shift Permutations on Real Life Fat Trees," Irwin and Joan Jacobs Center for Communication and Information Technologies, Sep. 2010, XP002686713, Retrieved from the Internet: URL: <http://webee.technion.ac.il/publicatio n-link/index/id/574>, [Retrieved on Nov. 6, 2012], 8 pages.

Gliksberg, J., et al., "Node-type-based load-balancing routing for Parallel Generalized Fat-Trees," 2018 IEEE 4th International Workshop on High-Performance Interconnection Networks in the Exascale and Big-Data Era, Feb. 2018, XP033342107, pp. 9-15.

* cited by examiner

METHOD FOR ESTABLISHING COMMUNICATION ROUTES BETWEEN NODES OF A COMPUTER CLUSTER, CORRESPONDING COMPUTER PROGRAM AND COMPUTER CLUSTER

CROSS-REFERENCE TO RELATED APPLICATIONS

This application claims priority to French Patent Application No. 1851558, filed Feb. 22, 2018, the entire content of which is incorporated herein by reference in its entirety.

FIELD

This invention relates to a method for establishing communication routes between nodes of a computer cluster, a corresponding computer program and a computer cluster.

BACKGROUND

A computer cluster may include:
nodes,
an interconnection network of the nodes, comprising:
   switches, to a part of which the nodes are connected,
   communication links between the switches.
The computer cluster has a certain topology defining the relative arrangement of the nodes, switches and communication links. A method for establishing communication routes between nodes of a computer cluster may be used to increase the performance levels of the computer cluster.

SUMMARY

A method for establishing communication routes between nodes of a computer cluster of the aforementioned type includes:
   obtaining the topology of the computer cluster, with first global numbers respectively assigned to the nodes,
   implementing, for each pair of nodes, an algorithm adapted for providing a communication route between the first and second nodes of the pair, based on respective numbers of these nodes and the topology of the computer cluster, the algorithm being adapted for passing routes via the same communication link, the first or second nodes of which routes have periodic numbers according to a periodicity greater than one.
In an aspect of the invention, the method for establishing communication routes between nodes of a computer cluster of the aforementioned type further comprises:
   selecting nodes,
   numbering the nodes in order to assign second global numbers thereto, which numbers are different from the first global numbers for at least one part of the selected nodes, the second global numbers of the selected nodes being successively separated by values each of which is different from the periodicity of each of at least one part of the communication links,
and wherein, in order to implement the algorithm, the nodes are identified by the second global numbers thereof.
Thus, thanks to an aspect of the invention, the algorithm is implemented based on numbers of the nodes in which the numbers of the selected nodes do not have the periodicity of at least one part of the communication links. This ensures that the routes joining these selected nodes do not all pass via one of these communication links. Thus, the use of the communication links is well balanced for the selected nodes.

By selecting the nodes exchanging a large quantity of data and thanks to this balancing, the risk of the same communication link being used for lots of selected nodes is reduced, thus reducing the risk of this communication link becoming congested.

Optionally, the selected nodes have a common feature of which the other nodes are devoid.

Also optionally, the common feature is that the selected nodes are optical network interfaces.

Also optionally, the common feature is that the selected nodes belong to storage computers.

Also optionally, the common feature is that the selected nodes belong to computer processors comprising a graphics processing unit.

Also optionally, the second global numbers of the selected nodes are successive.

Also optionally, the method further comprises:
   determining the periodicity of each of at least one part of the communication links,
   determining values intended to successively separate the second global numbers of the selected nodes, whereby each determined value is different from each determined periodicity.

Also optionally, the nodes are connected to connection ports of a part of the switches, these connection ports having local numbers within the switch to which these connection ports belong, and wherein the first global numbers are obtained from the local numbers.

Also optionally, the first global numbers of the nodes connected to connection ports of a switch follow on from each other consecutively in the same order as the local numbers of the connection ports to which these nodes are respectively connected.

Also optionally, the method further comprises:
   discovering the computer cluster in order to determine the topology thereof, the nodes being numbered according to the first global numbering system during this discovery.

Also optionally, the computer cluster is designed to alternate first phases during which the unselected nodes exchange data between one another, and second phases during which the unselected nodes exchange data with the selected nodes.

An aspect of the invention further relates to a computer program that can be downloaded from a communication network and/or saved on a non-transitory computer-readable medium and/or executable by a processor, comprising machine readable instructions for carrying out the steps of a method for establishing communication routes between nodes of a computer cluster as described above, when the program is executed on a computer.

An aspect of the invention further relates to a computer cluster comprising:
   nodes,
   an interconnection network of the nodes, comprising:
      switches, to a part of which the nodes are connected,
      communication links between the switches,
the computer cluster having a certain topology defining the relative arrangement of the nodes, switches and communication links, the computer cluster comprising:
   means for obtaining the topology of the computer cluster, with first global numbers respectively assigned to the nodes,
   means for implementing, for each pair of nodes, an algorithm adapted for providing a communication route between the first and second nodes of the pair, based on respective numbers of these nodes and the topology of the computer cluster, the algorithm being adapted for passing routes via the same communication link, the first or second nodes of which routes have periodic numbers according to a periodicity greater than one, means for selecting nodes, means for numbering the nodes in order to assign second global numbers thereto, which numbers are different from the first global numbers for at least one part of the selected nodes, the second global numbers of the selected nodes being successively separated by values different from the respective periodicity of each of at least one part of the communication links, and wherein, in order to implement the algorithm, the nodes are identified by the second global numbers thereof.

In an embodiment, the computer cluster comprises a processor and a non-transitory computer readable medium including machine readable instructions, executable by the processor, for:

obtaining the topology of the computer cluster, with first global numbers respectively assigned to the nodes, implementing, for each pair of nodes, an algorithm designed for providing a communication route between the first and second nodes of the pair, based on respective numbers of these nodes and the topology of the computer cluster, the algorithm being designed for passing routes via the same communication link, the first or second nodes of which routes have periodic numbers according to a periodicity greater than one, selecting nodes, numbering the nodes in order to assign second global numbers thereto, which numbers are different from the first global numbers for at least one part of the selected nodes, the second global numbers of the selected nodes being successively separated by values each of which is different from the periodicity of each of at least one part of the communication links, wherein, in order to implement the algorithm, the nodes are identified by the second global numbers thereof

BRIEF DESCRIPTION OF THE DRAWINGS

The invention will be better understood thanks to the following description, which is provided for purposes of illustration only and with reference to the accompanying drawings, wherein.

DETAILED DESCRIPTION

Figure 1:
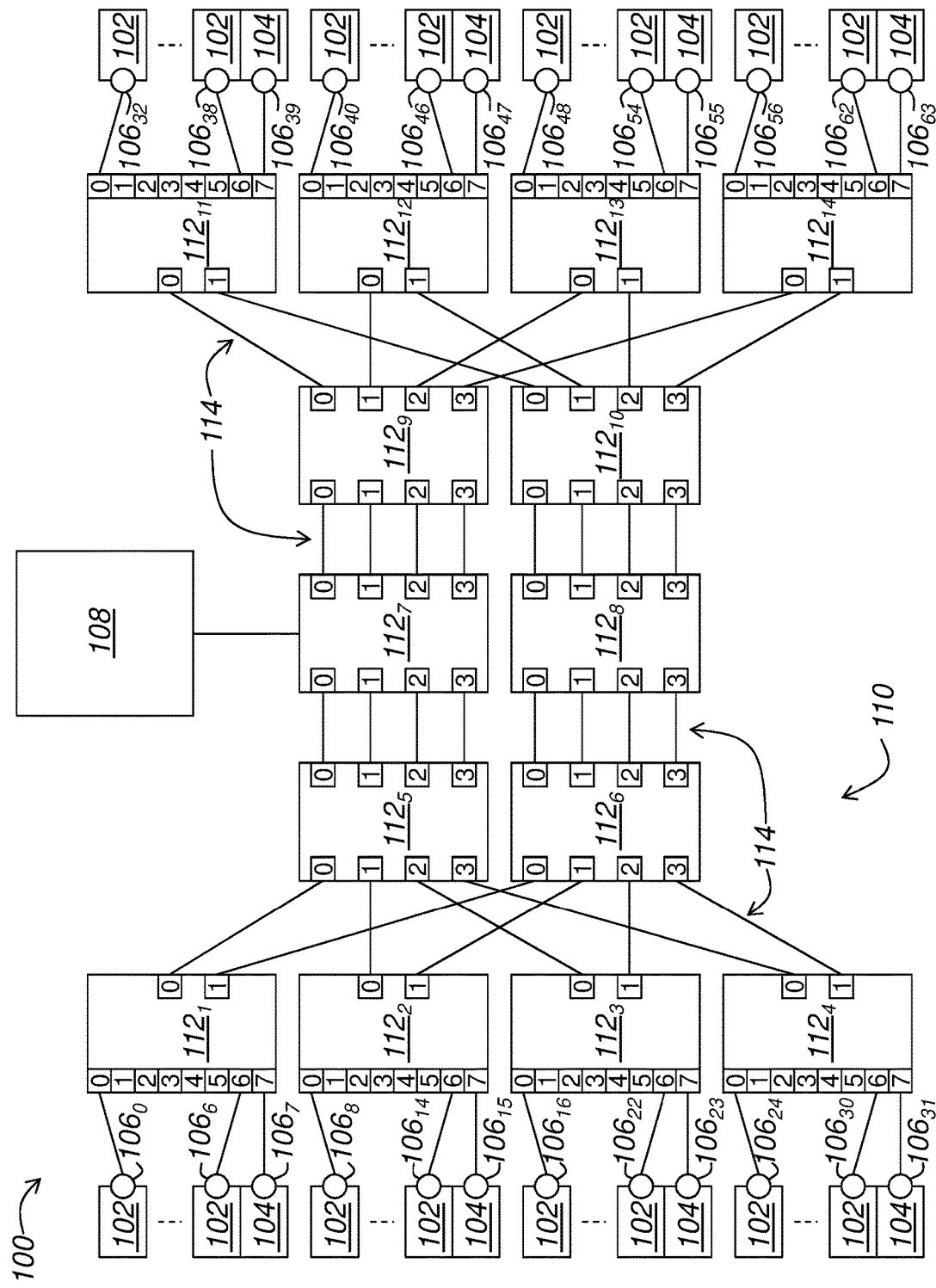
FIG. 1 diagrammatically shows the general structure of a computer cluster according to an embodiment of the invention.

With reference to FIG. 1, a computer cluster 100 implementing an aspect of the invention will now be described.

The computer cluster 100 groups together independent computers 102, 104 appearing from the outside to be a single computer with a very high computing power, referred to as an HPC (High Performance Computer). Each computer 102, 104 comprises, as known per se, a central processing unit, a main memory in which instructions for the central processing unit are intended to be recorded, and at least one network interface.

The network interfaces respectively form nodes $106_0 \ldots 106_{63}$ of the computer cluster 100. A plurality of network interfaces (and thus a plurality of nodes $106_0 \ldots 106_{63}$) can belong to the same computer 102, 104 or, in the example described, each computer 102, 104 can comprise only a single network interface forming one of the nodes $106_0 \ldots 106_{63}$.

Still in the example described, the computers 102, 104 of the computer cluster 100 comprise computer processors 102 and storage computers 104, the latter comprising mass memories such as hard disks for saving data used and/or produced by the computer processors 102.

The computer cluster 100 further comprises an administration server 108. The administration server 108 is in particular adapted for dialoguing with clients wanting to use the computer cluster 100, the latter thus being viewed by the clients as a single machine. The administration server 108 is further adapted to schedule, between the computer processors 102, tasks received from the clients. The administration server 108 is further adapted for implementing a method for establishing communication routes between nodes $106_0 \ldots 106_{63}$ of the computer cluster, as will be described hereinbelow. For this purpose, the administration server 108 comprises means for carrying out the steps that will be described hereinbelow. In the example described, the administration server 108 comprises, as is known per se, a central processing unit and a main memory in which instructions for the central processing unit are intended to be recorded. Thus, in the example described, the means are software means, in the form of a computer program that can be downloaded from a communication network and/or saved on a non-transitory computer-readable medium and/or executable by a processor, comprising instructions for carrying out the steps of the method when the computer program is executed on the administration server, e.g. executed by one or more processors of the administration server. Alternatively, or in addition, all or part of these means could be micro-programmed or micro-wired hardware means or components in dedicated integrated circuits. Thus, alternatively, the administration server 108 could be an electronic device comprised solely of digital circuits (without any computer program) for carrying out the same actions.

In other embodiments of the invention, the different functions of the administration server 108 could be divided between a plurality of devices, for example between a plurality of computers.

Such a computer cluster 100 allows complex processing operations and/or parallel computations to be distributed over at least one portion of the computer processors 102.

In the paragraphs below, the terms "compute nodes" and "storage nodes" will be respectively used to denote the nodes formed by a network interface belonging to a computer processor 102 and a storage computer 104 respectively.

In the example described, the network interfaces of the storage computers 104 are optical network interfaces, whereas the network interfaces of the computer processors 102 are electrical network interfaces having a bandwidth that is less than that of the optical network interfaces. Indeed, the storage computers 104 generally exchange more data than the computer processors 102.

The computer cluster 100 further comprises an interconnection network 110 of the nodes $106_0 \ldots 106_{63}$.

The network 110 comprises switches $112_1 \ldots 112_{14}$ and communication links 114 between the switches $112_1 \ldots 112_{14}$. Each switch $112_1 \ldots 112_{14}$ has a plurality of connection ports (shown in the form of small squares in FIG. 1) and each communication link 114 is connected between two connection ports of two respective switches $112_1 \ldots 112_{14}$.

The nodes $106_0 \ldots 106_{63}$ are respectively connected to connection ports of a part of the switches $112_1 \ldots 112_{14}$, referred to hereinbelow as external switches $112_1 \ldots 112_4$, $112_{11} \ldots 112_{14}$. The other switches $112_5 \ldots 112_{10}$ will be referred to hereinbelow as internal switches.

The computer cluster 100 has a certain topology defining the relative arrangement of the nodes $106_0 \ldots 106_{63}$, switches $112_1 \ldots 112_{14}$ and communication links 114. In the example described, the topology is that of a Parallel Generalized Fat Tree or PGFT. The topology of a PGFT is defined in general by the following notation: PGFT(h; $m_1 \ldots m_h$; $w_1 \ldots w_h$; $p_1 \ldots p_h$), where h is the number of levels between which the switches $112_1 \ldots 112_{14}$ are divided, $m_n$ is the number of switches at level n−1 (or nodes for the first level) connected to each switch at level n, $w_n$ is the number of switches at level n connected to each switch at level n−1 (or to each node for the first level) and $p_n$ is the number of parallel communication links used between levels n and n−1 (or between level n and the nodes for the first level).

The external switches $112_1 \ldots 112_4$, $112_{11} \ldots 112_{14}$, to which nodes $106_0 \ldots 106_{63}$ are connected thus form the switches at the first level. Moreover, in the PGFT topology, each communication link 114 is connected between two switches at consecutive hierarchical levels.

For each switch $112_1 \ldots 112_{14}$, the connection ports leading to a lower level (or to the nodes $106_0 \ldots 106_{63}$ in the case of the external switches $112_1 \ldots 112_4$, $112_{11} \ldots 112_{14}$) will be referred to hereinbelow as "lower connection ports", whereas the connection ports leading to an upper level will be referred to hereinbelow as "upper connection ports".

In the example described, the PGFT is defined by the notation PGFT(3; 8, 4, 2; 1, 2, 1; 1, 1, 4). Thus, eight nodes are connected to each external switch $112_1 \ldots 112_4$, $112_{11} \ldots 112_{14}$, the latter thus comprising eight lower connection ports.

The lower connection ports and the upper connection ports of each switch $112_1 \ldots 112_{14}$ are numbered, within this switch $112_1 \ldots 112_{14}$, according to a local numbering. The local numbers of the lower connection ports and the local numbers of the upper connection ports are provided in FIG. 1 inside the small squares. In particular, the lower connection ports of each external switch $112_1 \ldots 112_4$, $112_{11} \ldots 112_{14}$ are numbered each time according to a local numbering system respectively assigning thereto, in the example described, the local numbers from 0 to 7.

Still in the example described, the external switches $112_1 \ldots 112_4$, $112_{11} \ldots 112_{14}$ are all identical, at least as regards the lower connection ports thereof. Moreover, in the example described, the lower connection ports of the external switches $112_1 \ldots 112_4$, $112_{11} \ldots 112_{14}$ assigned the local number 7 are optical ports to which the optical network interfaces (forming the storage nodes $106_7$, $106_{15}$, $106_{23}$, $106_{31}$, $106_{39}$, $106_{47}$, $106_{55}$, $106_{63}$) of the storage computers 104 are connected. The other lower connection ports of the external switches $112_1 \ldots 112_4$, $112_{11} \ldots 112_{14}$ are electrical connection ports to which the compute nodes are connected. The connection ports (lower and upper connection ports) of the internal switches $112_5 \ldots 112_{10}$ are also electrical connection ports in the example described.

The administration server 108 is adapted for implementing an algorithm for establishing communication routes between nodes. More specifically, this algorithm is adapted for providing a communication route between a first node $106_0 \ldots 106_{63}$ and a second node $106_0 \ldots 106_{63}$ based on respective numbers of these nodes $106_0 \ldots 106_{63}$ and the topology of the computer cluster 100.

In the example described, the algorithm used is the D-mod-k algorithm, which awaits a number, denoted s, of a first node, referred to as a source node, and a number, denoted d, of a second node, referred to as a destination node, in order to define a communication route between these two nodes.

Starting from the source node, the communication route firstly passes via the external switch $112_1 \ldots 112_4$, $112_{11} \ldots 112_{14}$ to which the source node is connected. During a test step, the need to pass via an upper-level switch in order to reach the destination node is determined.

If this is the case, the following formula is used to select an upper connection port (and thus the upper-level switch via which to pass):

$[d/(w_0*p_0)/(w_1*p_1)/ \ldots /(w_{x-1}*p_{x-1})] \bmod(w_x*p_x)$ where [ ] represents the integer part and mod represents the modulo.

If this is not the case, the lower-level switch on the shortest path to the destination node is selected, then the following formula is used to select, in the case where a plurality of parallel links lead to the selected lower-level switch, a lower connection port:

$[d/(w_0* \ldots *w_{x-1})] \bmod(p_{x-1})$ where [ ] represents the integer part and mod represents the modulo.

The algorithm then returns to the test step.

For example, in the example described, when there is a need to pass from a switch at a first level $112_1 \ldots 112_4$, $112_{11} \ldots 112_{14}$ to a switch at a second level $112_5$, $112_6$, $112_9$, $112_{10}$, the algorithm D-mod-k gives the formula [d] mod 2, which is periodic with period two. In order to pass from a switch at a second level $112_5$, $112_6$, $112_9$, $112_{10}$ to a switch at a third level $112_7$, $112_8$, the algorithm D-mod-k gives the formula [d/2] mod 4, which is periodic with period eight.

The algorithm is thus adapted for passing routes via the same communication link, the destination nodes of which routes have periodic numbers according to a periodicity that is greater than (understood to mean "strictly greater than") one.

Alternatively, the algorithm S-mod-k could be used. In such a case, similar formulae to those of the algorithm D-mod-k are used, replacing the number s by the number d. The algorithm S-mod-k is thus also adapted for passing routes via the same communication link, the source nodes of which routes have periodic numbers according to a periodicity that is greater than (again understood to mean "strictly greater than") one.

Figure 2:
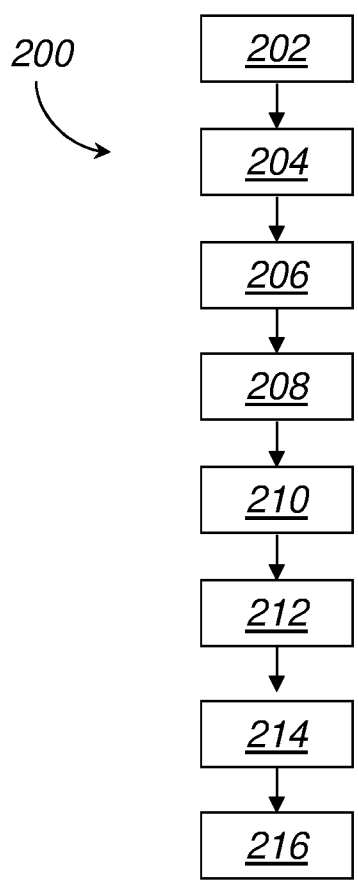
FIG. 2 shows the successive steps involved in a method for establishing communication routes between nodes of the computer cluster in FIG. 1 according to an embodiment of the invention.

With reference to FIG. 2, a first method 200 for establishing and using communication routes between nodes $106_0 \ldots 106_{63}$ of the computer cluster 100 will now be described.

During a step 202, the administration server 108 carries out a discovery on the computer cluster 100. The discovery is used to determine the topology of the computer cluster 100. Moreover, during the discovery, the nodes $106_0 \ldots 106_{63}$ found are numbered according to a first global numbering system assigning first respective global numbers to the nodes $106_0 \ldots 106_{63}$. In the example described, the first global numbers are obtained from the local numbers. More specifically, each time an external switch $112_1 \ldots 112_4$, $112_{11} \ldots 112_{14}$ is discovered, the nodes connected thereto are numbered consecutively, following on, where necessary, from the first global numbers already assigned, in the order of the local numbering system of the lower connection ports to which these nodes are connected.

For example, if the external switch $112_1$ is discovered first, the first global numbers 0-7 will be respectively assigned to the nodes $106_0 \ldots 106_7$. If the external switch $112_2$ is then discovered, the first global numbers 8-15 will be respectively assigned to the nodes $106_8 \ldots 106_{15}$, and so forth. It can thus be seen that, within the scope of the topology of the example described, the first global numbers of the storage nodes $106_7, 106_{15}, 106_{23}, 106_{31}, 106_{39}, 106_{47}, 106_{55}, 106_{63}$ are periodic with period eight.

Yet, as mentioned hereinabove, the formula [d/2] mod 4 for selecting upper connection ports for passing from the second level to the third level is also periodic with period eight. Thus, if the algorithm was used based on the first global numbers, all of the routes leaving from any of the nodes whose first global numbers are 0-31 and arriving at the storage nodes $106_7, 106_{15}, 106_{23}, 106_{31}, 106_{39}, 106_{47}, 106_{55}, 106_{63}$ would pass by the same communication link 114 running between the second and third levels. Thus, this communication link 114 would have to support all of the routes to four storage nodes $106_{39}, 106_{47}, 106_{55}, 106_{63}$. However, the storage nodes $106_7, 106_{15}, 106_{23}, 106_{31}, 106_{39}, 106_{47}, 106_{55}, 106_{63}$ are generally solicited to a greater extent than the compute nodes, such that this communication link 114 risks becoming very congested. Moreover, the functioning of the computer cluster 100 in order to perform a task generally alternates compute phases during which the compute nodes exchange data between one another, and data back-up and/or recovery phases during which the compute nodes exchange data with the storage nodes in order to save and/or read the data in the storage nodes. Thus, during data back-up and/or recovery phases, each communication link 114 used by a plurality of routes each connecting a compute node to a storage node would be highly solicited and risks becoming very congested.

After the discovery step 202, the administration server 108 thus obtains, during a step 204, the topology of the computer cluster 100, with the first global numbers respectively assigned to the nodes $106_0 \ldots 106_{63}$.

During a step 206, the administration server 108 selects nodes. In the example described, the storage nodes $106_7, 106_{15}, 106_{23}, 106_{31}, 106_{39}, 106_{47}, 106_{55}, 106_{63}$ are selected. The nodes to be selected are, for example, communicated to the administration server 108 by a human user via a man-machine interface. Alternatively, the administration server 108 could be designed for automatically determining which of the nodes $106_0 \ldots 106_{63}$ are connected to optical connection ports.

In general, the selected nodes are, in an embodiment, those which each have a common feature (which can be automatically detected for example), whereas the other nodes are devoid of this feature. In the example described, this feature is that the network interface forming the selected node is an optical network interface. Alternatively, other features could be taken into consideration. For example, the common feature could be that the node belongs to a storage computer. In another example, the common feature could be the presence of a graphics processing unit in the computer processor.

During a step 208, the administration server 108 numbers the nodes $106_0 \ldots 106_{63}$ according to a second global numbering that is different from the first global numbering, at least for a part of the selected nodes $106_7, 106_{15}, 106_{23}, 106_{31}, 106_{39}, 106_{47}, 106_{55}, 106_{63}$. In this second numbering, second global numbers are respectively assigned to the nodes $106_0 \ldots 106_{63}$, such that the second global numbers of the selected nodes $106_7, 106_{15}, 106_{23}, 106_{31}, 106_{39}, 106_{47}$ are successively separated by values each of which is different from the periodicity of each of at least one part of the communication links 114, and in an embodiment of all of the communication links 114.

In the example described, the second global numbers of the selected nodes $106_7, 106_{15}, 106_{23}, 106_{31}, 106_{39}, 106_{47}$ are chosen to be consecutive, such that the values separating them are all equal to one and thus necessarily different from the periodicities of all of the communication links 114.

For example, the following algorithm (comprising steps A to F) can be used to pass from the first global numbering system to the second global numbering system.

A: A counter is set to zero.

B: A type of node that has not yet been selected is selected. If all node types have been selected, the algorithm ends.

C: The first node of the type selected in the order of the first numbering system is taken as the current node.

D: The value of the counter is assigned to the current node as a second global number.

E: The counter is incremented.

F: The next node of the type selected in the order of the first numbering system is taken as the current node and the process returns to step D. If all nodes of the type selected have been processed, the algorithm returns to step B.

This algorithm is used with at least two types of nodes: a first node type formed by the selected nodes and a second node type formed by the unselected nodes.

Thus, in the example described, in the second global numbering system, the compute nodes are numbered from 0 to 55 and the storage nodes are numbered from 56 to 63.

During a step 210, the administration server 108 implements the algorithm by executing, for each pair of nodes, the nodes having been identified by the second global numbers thereof.

During a step 212, the administration server 108 implements, in the network 110, the routes provided by the algorithm in the step 210. In the example described, the routes are recorded in routing tables that are transmitted to each switch $112_1 \ldots 112_{14}$.

During a step 214, the administration server 108 receives, from a client, a request to execute a task.

During a step 216, at least one part of the computers 102, 104 executes the required task by communicating with one another over the network 110 using the communication routes established in the step 210.

Figure 3:
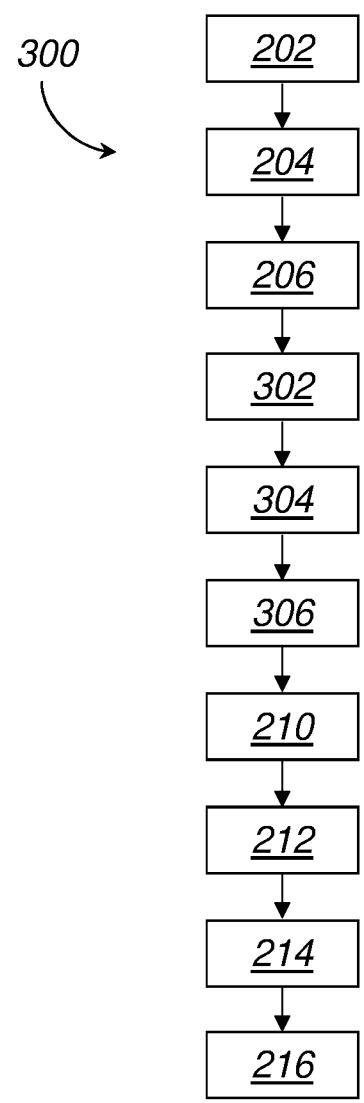
FIG. 3 shows the successive steps involved in a method for establishing communication routes between nodes of the computer cluster in FIG. 1 according to another embodiment of the invention.

With reference to FIG. 3, a second method 300 for establishing and using communication routes between nodes $106_0 \ldots 106_{63}$ of the computer cluster 100 will now be described.

The second method 300 comprises the steps 202, 204, 206 as for the first method 200.

After the step 206, the second method 300 comprises the following steps 302 to 306.

During the step 302, the administration server 108 determines the periodicity of each of at least one part of the communication links 114, in an embodiment all thereof. For example, this periodicity is determined from the formulae of the algorithm used.

During the step 304, the administration server 108 determines values intended to successively separate the second global numbers of the selected nodes $106_7, 106_{15}, 106_{23}$, $106_{31}$, $106_{39}$, $106_{47}$, $106_{55}$, $106_{63}$, whereby each determined value is different from each determined periodicity.

For example, in the example described, the communication links 114 extending between the first and second level have a periodicity of two, whereas the communication links 114 extending between the second level and the third level have a periodicity of eight. Thus, the values intended to successively separate the second global numbers of the selected nodes $106_7$, $106_{15}$, $106_{23}$, $106_{31}$, $106_{39}$, $106_{47}$, $106_{55}$, $106_{63}$ are each different from two and eight. For example, values each equal to one can be taken, such as in the method 200, or values that are different from each other can be taken, as long as they are different from two and eight.

During the step 306, the administration server 108 numbers the nodes $106_0$ ... $106_{63}$ according to a second global numbering system that is different from the first global numbering system, at least for a part of the selected nodes. In this second numbering system, the second global numbers of the selected nodes $106_7$, $106_{15}$, $106_{23}$, $106_{31}$, $106_{39}$, $106_{47}$ are successively separated by values determined in the step 304.

The second method 300 then comprises the steps 210 to 216 described above.

It is clear that a method such as those described above ensures that the use of the communication links is well balanced pour the selected nodes.

It should also be noted that the invention is not limited to the embodiments described hereinabove. More specifically, one of ordinary skill in the art will realize that various modifications can be provided to the embodiments described hereinabove, using the information disclosed herein. In the detailed presentation of the invention given hereinabove, the terms used must not be interpreted as limiting the invention to the embodiments presented in this description, however must be interpreted to include all equivalents, the prediction of which is within reach of one of ordinary skill in the art when applying his/her general knowledge to the implementation of the information disclosed herein.

What is claimed is:

1. A method for establishing communication routes between nodes of a computer cluster comprising:
   obtaining a topology of the computer cluster, with first global numbers respectively assigned to the nodes wherein the computer cluster comprises:
      a first node comprising a first node type comprising a direct electrical network interface;
      a second node comprising a second node type comprising an optical network interface;
      wherein said first node and said second node form a pair of nodes;
      an interconnection network of the nodes comprising:
         switches that comprise both said direct electrical network interface and said optical network interface wherein said switches couple with both said first node type and said second node type;
         other switches that comprise said direct electrical network interface and which couple with other switches;
         communication links between the switches and the other switches wherein switches comprise a lower level connection port that couples with a node or switch at a lower level and an upper connection port that couple with the node or switch at a high level;
      the computer cluster having a certain topology defining a relative arrangement of the nodes, switches and communication links;
   providing, for each said pair of nodes that comprise said first node type and said second node type, a communication route between the first node and the second node of the pair, based on respective numbers of these nodes and the topology of the computer cluster wherein a portion of said communication route is calculated from a source node to a destination node when calculating a need to connect to a higher-level switch defined as $$(d/(w_o * p_o)/(w_1 * p_1)/ \ldots /(w_{x-1} * p_{x-1})) \bmod (w_x * p_x)$$

wherein d a destination node, $w_n$ is a number of the switches at a level n connected to each switch at level n−1 or to each node for a first level and $p_n$ is a number of parallel communication links used between levels n and n−1;
   passing routes via a same communication link, the first node or the second node of which routes have periodic numbers according to a periodicity greater than one;
   selecting nodes;
   numbering the nodes in order to assign second global numbers thereto, which numbers are different from the first global numbers for at least one part of selected nodes, the second global numbers of the selected nodes being successively separated by values each of which is different from the periodicity of each of at least one part of the communication links;
   enabling the nodes that are identified by the second global numbers thereof to communicate with one another using said communication route based on the second global numbers.

2. The method according to claim 1, wherein the selected nodes have a common feature of which other nodes are devoid.

3. The method according to claim 2, wherein the common feature is that the selected nodes belong to storage computers.

4. The method according to claim 2, wherein the common feature is that the selected nodes belong to computer processors comprising a graphics processing unit.

5. The method according to claim 1, wherein the second global numbers of the selected nodes are successive.

6. The method according to claim 1, further comprising:
   determining the periodicity of each of at least one part of the communication links,
   determining values intended to successively separate the second global numbers of the selected nodes, whereby each determined value is different from each determined periodicity.

7. The method according to claim 1, wherein the nodes are connected to connection ports of a part of the switches, the connection ports having local numbers within a switch to which the connection ports belong, and wherein the first global numbers are obtained from the local numbers.

8. The method according to claim 7, wherein the first global numbers of the nodes connected to connection ports of a switch follow on from each other consecutively in a same order as the local numbers of the connection ports to which these nodes are respectively connected.

9. The method according to claim 1, further comprising:
discovering the computer cluster in order to determine the topology thereof, the nodes being numbered according to a first global numbering system during this discovery.

10. The method according to claim 1, wherein the computer cluster is adapted to alternate first phases during which unselected nodes exchange data between one another, and second phases during which the unselected nodes exchange data with the selected nodes.

11. A non-transitory computer readable medium including a program comprising machine readable instructions for carrying out the steps of a method for establishing communication routes between nodes of a computer cluster according to claim 1, when said program is executed on a computer.

12. A method for utilizing a computer cluster comprising:
obtaining a topology of the computer cluster, with first global numbers respectively assigned to nodes of the computer cluster, wherein the computer cluster comprises:
a first node comprising a first node type comprising a direct electrical network interface;
a second node comprising a second node type comprising an optical network interface;
wherein said first node and said second node form a pair of nodes;
an interconnection network of the nodes comprising:
switches that comprise both said direct electrical network interface and said optical network interface wherein said switches couple with both said first node type and said second node type;
other switches that comprise said direct electrical network interface and which couple with other switches;
communication links between the switches and the other switches wherein switches comprise a lower level connection port that couples with a node or switch at a lower level and an upper connection port that couple with the node or switch at a high level;
the computer cluster having a certain topology defining a relative arrangement of the nodes, switches and communication links;
providing, for each said pair of nodes that comprise said first node type and said second node type, a communication route between the first node and the second node of the pair, based on respective numbers of these nodes and the topology of the computer cluster wherein a portion of said communication route is calculated from a source node to a destination node when calculating a need to connect to a higher-level switch defined as $$(d/(w_o*p_o)/(w_1*p_1)/\ldots/(w_{x-1}*p_{x-1}))\bmod(w_x*p_x)$$

wherein d a destination node, $w_n$ is a number of the switches at a level n connected to each switch at level n−1 or to each node for a first level and $p_n$ is a number of parallel communication links used between levels n and n−1;
passing routes via a same communication link, the first node or the second node of which routes have periodic numbers according to a periodicity greater than one;
selecting nodes;
numbering the nodes in order to assign second global numbers thereto, which numbers are different from the first global numbers for at least one part of selected nodes, the second global numbers of the selected nodes being successively separated by values each of which is different from the periodicity of each of at least one part of the communication links;
enabling the nodes that are identified by the second global numbers thereof to communicate with one another using said communication route based on the second global numbers.

* * * * *